Dec. 24, 1946.  A. G. DEAN  2,412,972
METHOD OF REPAIRING SKIN BLANKETS
Filed Nov. 5, 1943  2 Sheets-Sheet 1

INVENTOR
Albert G. Dean
BY John P. Tarbox
ATTORNEY

Dec. 24, 1946.  A. G. DEAN  2,412,972
METHOD OF REPAIRING SKIN BLANKETS
Filed Nov. 5, 1943  2 Sheets-Sheet 2
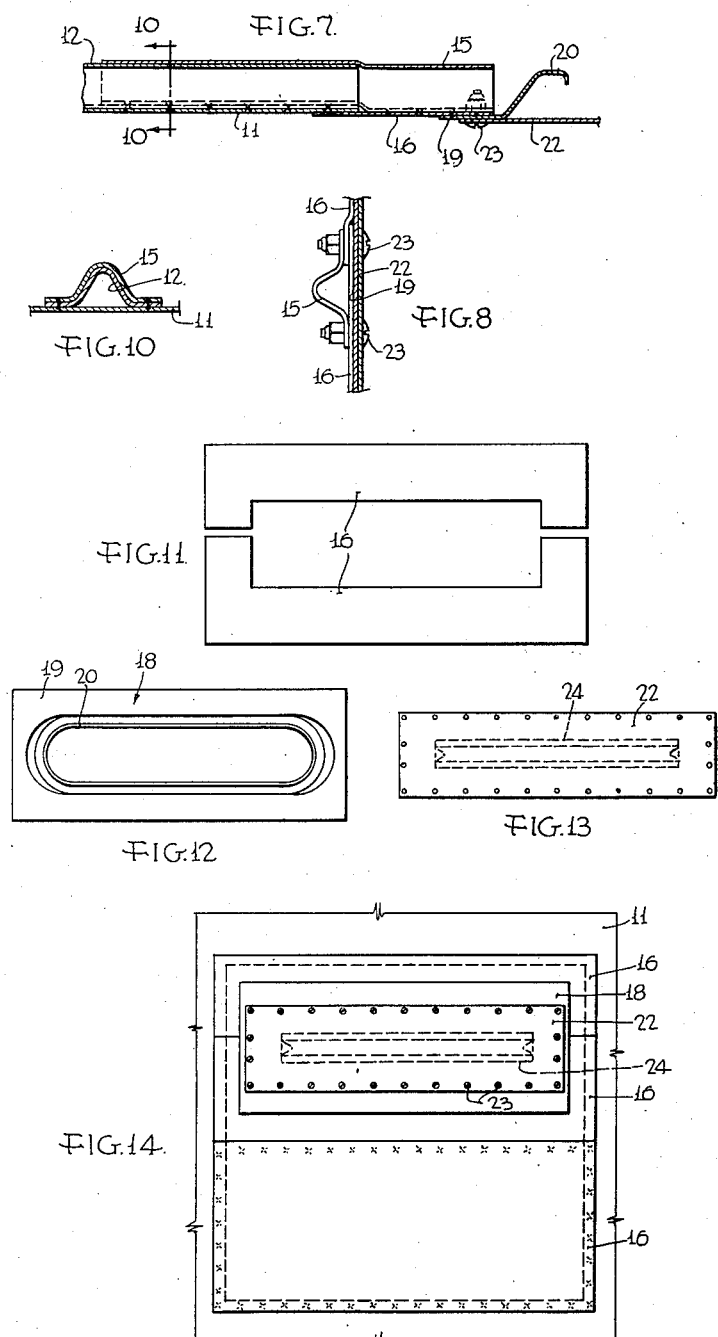
INVENTOR
Albert G. Dean.
BY John P. Tarbox
ATTORNEY Patented Dec. 24, 1946

2,412,972

UNITED STATES PATENT OFFICE 2,412,972

METHOD OF REPAIRING SKIN BLANKETS

Albert G. Dean, Narberth, Pa., assignor to The Budd Company, Philadelphia, Pa., a corporation of Pennsylvania Application November 5, 1943, Serial No. 509,047

5 Claims. (Cl. 29—148)

This invention relates to methods of repairing a skin blanket by cutting and welding and has for an object the provision of improvements in this art.

It is now common practice to make aircraft coverings of sheet metal reinforced by frame members. The sheet metal covering is usually called the skin; the immediate frame members are called stringers; and the skin and stringers together may be designated as a skin blanket. Heavier frame structures support the skin blanket interiorly.

In service, particularly in combat, the skin blanket may be torn; and in most cases the damaged areas are of relatively small extent, as where projectiles have entered or emerged. However, due to the fact that the total areas covered by the skin blankets are usually very large, that most of the surfaces do not provide accommodation for a mechanic and access to the interior; and that even when there is access to the interior it is very difficult to cooperate with a mechanic working on the outside, it becomes desirable to provide a method and means for making repairs to such damaged skin blankets entirely from the outside. A subordinate factor which prevails in connection with riveted constructions and to a greater degree in connection with welded constructions is that it may be necessary to employ considerable pressure in making the joints and this can only be provided practically by using a C-type yoke which has one arm disposed inside the skin blanket and the other outside. Provision must be made for the entry of one arm through the skin blanket and means must be provided for closing the entry opening after the principal repair operations have been completed. The yoke arms are short, especially for emergency repairs, hence a method of repair is needed which will be equally applicable to extensive and limited areas of damage. As far as possible the repair, though made in emergency, should be permanent in its nature.

The present invention is intended to provide for making such repairs in a rapid and effective manner.

The above and other objects and advantages of the invention will be apparent from the following description of an exemplary embodiment thereof, reference being made to the accompanying drawings, wherein:

Fig. 7 is an enlarged section taken on the line 7—7 of Fig. 6;

Fig. 8 is an enlarged section taken on the line 8—8 of Fig. 6;

Fig. 9 is an enlarged section taken on the line 9—9 of Fig. 6;

Fig. 10 is a section taken on the line 10—10 of Fig. 7;

Fig. 11 is a plan view of the skin repair sheets alone;

Fig. 12 is a plan view of the closure frame alone;

Fig. 13 is a plan view of the closure alone; and

Fig. 14 is a view similar to Fig. 6 showing the repair structure for a larger damaged area.

The damaged airfoil which is to be repaired may, by way of example, comprise a skin blanket 10 which includes a sheet metal skin 11 and stringers 12. It is assumed that the skin is torn as indicated by the jagged line 13 and the stringers are broken or mutilated. For simplicity it is represented that the stringers are torn off at the skin tear edge but it will be understood that this may not be the usual actual damaged condition.

Figure 1:
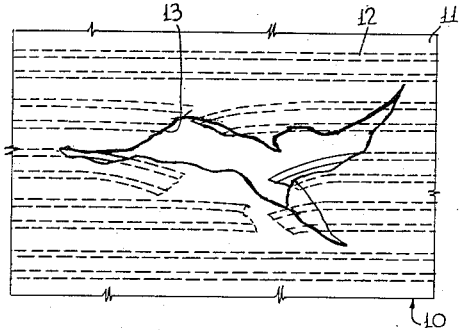
Fig. 1 is a plan view of a damaged airfoil which is to be repaired.
Figure 2:
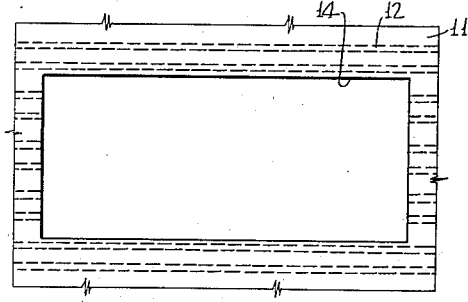
Fig. 2 is a similar view after the edges have been cut back to sound material.

The first step in making the repair is to cut away the damaged structure to some regular shaped opening represented by the line 14, as shown in Fig. 2. The cut may be roughly made by a torch such as oxy-acetylene or electric arc and the edges are trimmed back of the burned material by metal trimmers of any convenient type.

At this stage, while there is a large access opening all necessary repairs are made to the interior framework, such as the ribs, spars, struts, and the like.

Next, stringer splicers 15 are provisionally secured as by tack welding to the ends of the cut stringers. If the damaged area is small the stringer splicers may all be placed at one time but if the area is large the repair may be made in stages by adding successive widths of material equal to the reach of the yoke arms.

Figure 4:
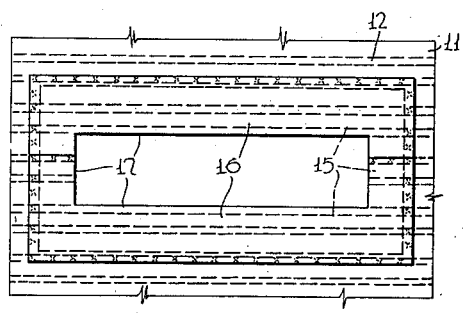
Fig. 4 is a similar view after skin repair sheets have been secured.

Upon the stringer splicers 15 and overlapping the edges of the skin around the opening there are placed one or more skin repair sheets 16 of any desired and convenient shape, as shown in Fig. 4. They, like the stringers, may first be provisionally secured in position, as by tack welding, at a few points.

After the required stringer splicers and skin repair sheets have been placed and tack welded for any sectional area within the reach of the arms of the pressure welding gun they are permanently welded by a pressure welding gun whose inner arm is inserted through the opening in the skin blanket.

Figure 3:
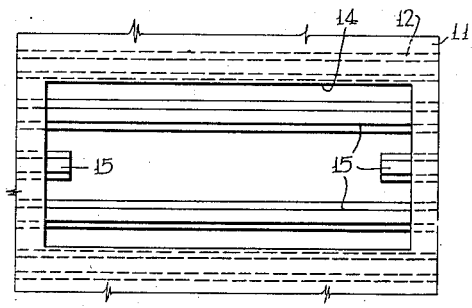
Fig. 3 is a similar view after stringer splicers have been placed.

Fig. 14 shows the application of additional stringer splicers and skin repair sheets 16. Two of the final stringer splicers are stub pieces, as in Fig. 3, to leave an opening for the welding gun between their ends.

After all the required stringer splicers and skin repair sheets have been permanently secured, there is left a final opening of a predetermined size, the edges of which are designated by the numeral 17, as shown in Fig. 4. This opening is preferably bordered by the sides and ends of the stringer splicers 15. If not, it may be strengthened by any suitable doubler strips welded as a frame around the opening.

Figure 5:
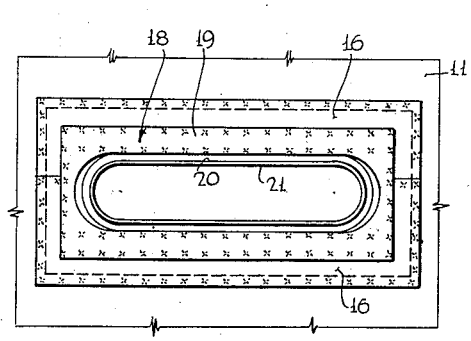
Fig. 5 is a similar view after a closure frame has been secured.
Figure 6:
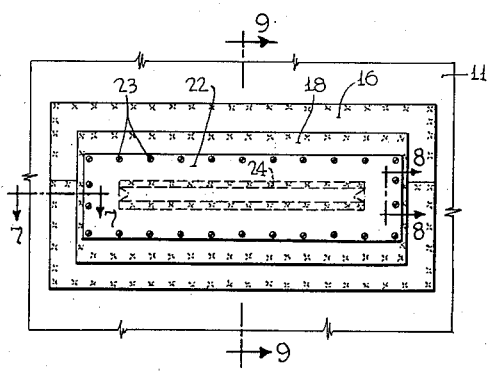
Fig. 6 is a similar view after a closure plate has been secured.

Among the repair supplies there is provided a standard closure frame 18 (Fig. 5) of predetermined size to fit the final opening which is left in the skin blanket. There may, of course, be a number of sizes of frames; but it is only necessary to show a selected one. This frame includes a plate portion 19 and an interior peripheral flange 20 extending inward therefrom and defining an opening whose edges are designated by the numeral 21. The flange may be welded to the plate or made integral, as by stamping.

This smallest size opening is still large enough to pass the inner arm of the pressure welding gun, and the gun is now used to weld the frame to the repair skin and stringers. The frame may, of course, be first tack welded, if desired.

The edges of the frame plate and the underlying skin and stringers are drilled, preferably using preformed holes in a cover plate as a templet, and bolt or screw anchors of suitable type are secured at the inner ends of the holes.

Finally, a cover plate 22 is secured over the opening by bolts or screws 23. The plate and frame may be provided with matching holes as originally made, for convenience. The frame then does not have to be drilled in making the repair but merely serves as a templet for drilling skin and stringers.

The repair structure is designed to be as strong and rigid as the original structure without the cover plate; but the cover plate provides additional strength and, if desired, the plate may be provided with one or more stringers 24 welded thereto to give still greater strength.

It is thus seen that the invention provides an improved repair construction and an improved method of repairing a metal skin blanket. And although the repair is easily made as an emergency measure, the construction provided is as strong or stronger than the original construction and permanent in its nature. If cold rolled stainless steel was used it may be matched in the repair structure with the same preservation of strength as in the original factory made structure.

While one embodiment has been described by way of example, it is to be understood that the invention may have various embodiments within the limits of the prior art and the scope of the subjoined claims.

What is claimed is:

1. The method of repairing a skin blanket including a skin and stringers, which comprises, cutting away the damaged structure to form a regular shaped opening, securing stringer splicers to the original stringer ends in the opening at the injured portion leaving a smaller opening for access of an arm of a pressure repair attaching tool such as a welding gun, securing a repair skin over the edges of the larger opening and upon the stringer splicers leaving a smaller opening for the tool arm, securing around the smaller opening a closure frame having an opening which provides access for the tool arm to secure it, and securing a closure to frame.

2. The method as set forth in claim 1, which further comprises attaching said stringer splicers and repair skin sheets in stages in widths which can be spanned by the arm of the tool, at each stage decreasing the size of the opening until the size required to take a stock size closure frame is reached.

3. The method of repairing a damaged enclosed airfoil which is inaccessible to an operator inside, the airfoil including a skin blanket of skin and stringers secured to interior framing, which method comprises, cutting away the damaged skin and stringers to sound material to form an enlarged opening in the blanket, provisionally securing stringer splicers in the opening as by tack welding, securing skin pieces on the stringers as by pressure welding to permanently secure the skin and stringers across the opening leaving a smaller access opening, securing a reinforced frame around said smaller opening, and securing a closure plate over said frame opening.

4. The method of repairing a skin blanket as of cold-rolled stainless steel which comprises, cutting away the damaged blanket by a torch to approximate size, trimming the opening to final size by a metal cutting tool to eliminate the heat-injured metal, tack welding stringer elements to parts around the opening, tack welding a repair skin piece over the stringer elements, pressure welding the stringer elements and skin piece permanently in place leaving a smaller access opening, welding a closure frame around said closure opening, and securing a closure to said frame by securing means actuated wholly from the outside of the airfoil.

5. The method of repairing the frame and covering of a metallic structure, which comprises, cutting away the damaged structure and forming a regular shaped opening in the cover, making necessary repairs to the frame through the cover opening, securing cover repair parts around the edges of the opening leaving a smaller opening of a size to permit working therethrough with a pressure tool such as a welding gun, securing a frame around the opening as by a pressure tool working through the opening, and securing a closure to said frame.

ALBERT G. DEAN.